US009652888B1

(12) United States Patent
Johnson et al.

(10) Patent No.: US 9,652,888 B1
(45) Date of Patent: May 16, 2017

(54) PREDICTED WEATHER DISPLAY AND DECISION SUPPORT INTERFACE FOR FLIGHT DECK

(71) Applicant: The United States of America as Represented by the Administrator of the National Aeronautics & Space Administration (NASA), Washington, DC (US)

(72) Inventors: Walter W. Johnson, Santa Clara, CA (US); Dominic G. Wong, Castro Valley, CA (US); Shu-Chieh Wu, Sunnyvale, CA (US); Robert W. Koteskey, Danville, CA (US)

(73) Assignee: The United States of America as Represented by the Administrator of the National Aeronautics and Space Administration, Washington, DC (US)

( * ) Notice: Subject to any disclaimer, the term of this patent is extended or adjusted under 35 U.S.C. 154(b) by 321 days.

(21) Appl. No.: 13/747,875

(22) Filed: Jan. 23, 2013

Related U.S. Application Data

(60) Provisional application No. 61/659,291, filed on Jun. 13, 2012.

(51) Int. Cl.
*G06T 17/05* (2011.01)
(52) U.S. Cl.
CPC ............................. *G06T 17/05* (2013.01)
(58) Field of Classification Search
None
See application file for complete search history.

(56) References Cited

U.S. PATENT DOCUMENTS

2009/0109065 A1\* 4/2009 Pinheiro ................. 340/971
2011/0102192 A1\* 5/2011 Batsakes et al. ........ 340/905
2011/0153742 A1\* 6/2011 Sloop et al. ............. 709/204

OTHER PUBLICATIONS

Sims, et al.., More intuitive graphics for Collaborative Convective Forecast Product (CCFP). Proc. IIth Conference on Aviation, Range, and Aerospace Meteorology, Oct. 2004.
DeLaura, et al., An exploratory study of modeling enroute pilot convective storm flight devi . . . , Proc. 12th' Conference on Aviation, Range, and Aerospace Meteorology, 2006.
DeLaura, et al., Modeling convective weather avoidance in enroute airspace, Proc. 13th Conference on Aviation, Range, and Aerospace Meteorology, Jan. 2008.
Evans, Key research issues for near term operational use of integrated convective weather- . . . , Proc. 13th Conf. on Aviation, Range, and Aerospace Meteorology, Jan. 2008.

\* cited by examiner

*Primary Examiner* — Maurice L McDowell, Jr.
*Assistant Examiner* — Donna J Ricks
(74) *Attorney, Agent, or Firm* — Christopher J. Menke; John F. Schipper; Robert M. Padilla (57) ABSTRACT

A system and method for providing visual depictions of a predictive weather forecast for in-route vehicle trajectory planning. The method includes displaying weather information on a graphical display, displaying vehicle position information on the graphical display, selecting a predictive interval, displaying predictive weather information for the predictive interval on the graphical display, and displaying predictive vehicle position information for the predictive interval on the graphical display, such that the predictive vehicle position information is displayed relative to the predictive weather information, for in-route trajectory planning.

31 Claims, 8 Drawing Sheets

PREDICTED WEATHER DISPLAY AND DECISION SUPPORT INTERFACE FOR FLIGHT DECK

This Application claims the benefit of U.S. Provisional Application No. 61/659,291, filed Jun. 13, 2012.

ORIGIN OF INVENTION

The invention described herein was made in the performance of work under NASA contracts and by an employee of the United States Government and is subject to the provisions of Section 20135(b) of the National Aeronautics and Space Act, Public Law 111-314, §3 (124 Stat. 3330, 51 U.S.C. Chapter 201), and 35 U.S.C. §202 Public Law 96-517, and may be manufactured and used by or for the Government for governmental purposes without the payment of any royalties thereon or therefore. In accordance with 35 U.S.C. §202, the contractor elected not to retain title.

BACKGROUND OF INVENTION

Technical Field of Field of the Invention

The present invention relates to in-route trajectory planning for vehicles based on predictive weather forecasts, and more particularly, flight deck in-flight trajectory planning for aircraft based on predictive weather forecasts.

Description of the Prior Art

Predictive weather forecasts, particularly convective forecasts, are designed for, and made available to, air traffic controllers and airline dispatchers on the ground, for tactical and strategic planning purposes. For example, the Collaborative Convective Forecast Product (CCFP) is the primary tool brought together by the meteorological community and the commercial aviation industry to address the impact of convective weather on the NAS at strategic time frames of 2-6 hours [2]. The CCFP has been undergoing continual revisions since it was first brought out in 1999, in terms of its update cycle and geographical coverage, as well as its graphic representations [3]. In its current version, the CCFP is available primarily in an ASCII coded text format [4].

There are also simplified graphical representations of part of the information. Early versions of the CCFP painted color coded polygons over a map of the domestic US to represent convective activities (5). Colors in yellow, orange, and red represents expected coverage from low (25% to 49%) to high (75% to 100%). Polygons are accompanied by a textbox providing additional information including echo tops and coincidence levels. The current version of CCFP uses the density of pattern shading (sparse, medium, and solid) to represent coverage and uses color (gray and blue) to represent the forecaster's confidence level (low and high, respectively).

REFERENCES

[1] Joint Planning and Development Office, Concept of Operations for the Next Generation Air Transportation System. Version 3.2. September 2010

[2] M. P. Kay. "An analysis of collaborative convective forecast product performance for the 2005 convective season." *Proc. 12$^{th}$ Conference on Aviation. Range, and Aerospace.* January 2006.

[3] T Faliev. and D. Rodenhuis, "Continual evolution of CCFP—User needs for extended range prediction", *Proc. 11$^{th}$ Conference on Aviation, Range, and Aerospace Meteorology.* October 2004.

[4] National Oceanic and Atmospheric Association's National Weather Service. Aviation Weather Center. "Collaborative Convection Forecast Product. Product description document," retrieved from the web on Jan. 23, 2011. http://aviationweather.gov/products/ccfp/docs/pdd-ccfp-.pdf.

[5] D. L. Sims, R. Wise, T Yuditsky, S. McGcttigan, and P J Smith. *"More intuitive graphics for Collaborative Convective Forecast Product (CCFP)", Proc. 11$^{th}$ Conference on Aviation, Range, and Aerospace Meteorology,* October 2004.

[6] J. Lachter, V Battiste, R. Koteskey, A.-Q., Dao, S. L. Brandt, S. V. Ligda, S.-C., Wu, and W. W. Johnson, "Issues for near-term implementation of trajectory based operations." Paper to be presented at the Ninth USA/Europe Air Traffic Management Research and Development Seminars, 2011.

[7] J Rasmussen, and K, J. Vicente, "Coping with human errors through system design: Implications for ecological interface design." *Int. J. Man-Machine Studies*, vol 31, pp 517-534, 1989.

[8] K J Vicente, and J Rasmussen. "The ecology of human-machine system II; Mediating "Direct Perception" in complex work domains," *Ecological Psychology*, vol 2. pp. 207-249. 1990.

[9] K. J. Vicente, and J Rasmussen, "Ecological interface design Theoretical Foundations," IEEE Trans. Sys. Man Cyber. vol 22. pp. 589-606, 1992.

[10] K. J. Vicente, "Ecological interlace design: Progress and challenges," *Human Factors,* vol. 44, pp. 62-78. 2002.

[11] M. Mulder, R Winterberg. M. M. van Paassen, and M. Mulder, "Direct manipulation interfaces for in-flight four-dimensional navigation planning," *Int. J. Aviation Psychology*, vol 20, pp. 249-268, 2010.

[12] R. DeLaura, and J. Evans, "An exploratory study of modeling enroute pilot convective storm flight deviation behavior," *Proc. 12$^{th}$ Conference on Aviation, Range, and Aerospace Meteorology.* 2006.

[13] R. DeLaura, M. Robinson, M. Pawlak, and J. Evans, "Modeling convective weather avoidance in enroute airspace." *Proc. 13$^{th}$ Conference on Aviation, Range, and Aerospace Meteorology,* January 2008.

[14] J. E. Evans, "Key research issues for near term operational use of integrated convective weather-ATM decision support system," *Proc. 13$^{th}$ Conference on Aviation, Range, and Aerospace Meteorology.* January 2008.

SUMMARY OF THE INVENTION

In accordance with one aspect of the present invention, there is provided a method of providing visual depictions of a predictive weather forecast for in-route vehicle trajectory planning. The method includes displaying weather information for time T on a graphical display; displaying vehicle position information for time T on the graphical display; selecting a predictive time interval X; displaying predictive weather information for time T+X on the graphical display; and displaying predictive vehicle position information for time T+X on the graphical display, such that the predictive vehicle position information is displayed relative to the predictive weather information for in-route trajectory planning.

Predictive weather information and predictive vehicle position information may be displayed chronologically for a plurality of times between time T and time T+X. The chronologically displayed information may also be displayed repeatedly, for example, looped images.

The predictive time interval X may be selected with a predictive time interval button on the graphical display. There may be a plurality of predictive time interval buttons representing different time intervals. The predictive time interval button may be selected by clicking on the button with a mouse.

The predictive time interval X may also be selected with a predictive time interval slider button on the graphical display. The predictive time interval slider button may be dragged along a slider range representing time T to time T+X, such that predictive weather information and 1 predictive vehicle position information is displayed for times between time T and time T+X, inclusive.

The predictive time interval X may further be selected by hovering a cursor over a predictive time interval slider range on the graphical display. The cursor may be moved along the predictive time interval slider range, such that predictive weather information and predictive vehicle position information is displayed for times between time T and time T+X, inclusive.

In accordance with another aspect of the invention, there is provided a method of providing visual depictions of a predictive weather forecast for in-route vehicle trajectory planning. The method includes displaying a planned trajectory of a vehicle on a graphical display; displaying vehicle position information at position P on the planned trajectory; displaying current weather information on the graphical display when the vehicle is at position P; selecting a point Y along the planned trajectory, where point Y is downrange of position P; displaying predictive vehicle position information at point Y on the graphical display; and, displaying predictive weather information on the graphical display, where the predictive weather information is based on a time when the vehicle is at point Y, such that the predictive vehicle position information is displayed relative to the predictive weather information for in-route vehicle trajectory planning.

The predictive weather information and predictive vehicle position information may be displayed sequentially for a plurality of locations on the planned trajectory between position P and point Y, inclusive. The sequentially displayed information may also be repeatedly displayed, for example, looped images.

The point Y along the planned trajectory may be selected with a predictive location button on the graphical display. There may be a plurality of predictive location buttons representing a plurality of different locations on the planned trajectory. The predictive location button may be selected by clicking on the button with a mouse.

The point Y along the planned trajectory may be selected with a predictive location slider button on the graphical display. The predictive location slider button may be dragged along a slider range representing position P to point Y, such that predictive weather information and predictive vehicle position information is displayed for locations between position P and point Y, inclusive.

The point Y along the planned trajectory may also be selected by hovering a cursor over a predictive location slider range on the graphical display. The cursor may be moved along the predictive location slider range, such that predictive weather information and predictive vehicle position information is displayed for locations between position P and point Y, inclusive.

The point Y along the planned trajectory may further be selected by hovering a cursor over the planned trajectory on the graphical display. The cursor by be moved along the planned trajectory, such that predictive weather information and predictive vehicle position information is displayed for locations between position P and point Y, inclusive.

In related aspects of the invention, the vehicle of the invention may be an aircraft, watercraft, or land craft. The weather information may be displayed using the colors: green, yellow, and red. The predictive weather information may be displayed in shades of gray. The shades of gray may be semi-transparent. The vehicle position information may be displayed with a symbol representing a position of the vehicle. The symbol may be a blue bead.

At least one of the displaying steps of the invention may include displaying information in two-dimensions, three-dimensions, and/or four-dimensions.

BRIEF DESCRIPTION OF THE DRAWINGS

The accompanying figures, where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION OF THE INVENTION

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically.

Herein, a flight deck predictive weather forecast interface supporting trajectory-based operation is disclosed. Predictive weather forecasts are made available and are assimilated into decision making processes in the flight deck. Further, weather avoidance decisions based on predictive forecasts are enabled to be executed on the flight deck under Trajectory-Based Operations (TBO). Three prototype methods are disclosed by which predictive weather forecasts can be viewed in conjunction with tools to modify light trajectories.

In accordance with the disclosure, eighteen transport pilots participated in a part-task experiment where they were asked to modify light trajectories when necessary using one of the three methods. Subjective evaluations by the pilots showed overall acceptance of the concepts behind all of the methods. Performance results showed that different methods of the disclosure were preferable under different weather encounter scenarios. Implications on designing interfaces to support weather decisions in Air Traffic Management (ATM) environments are discussed herein. Keywords-relating to the disclosure include, but are not limited to, predictive weather; light deck; trajectory-bused operations; eye tracking; part-task; and human factors.

The disclosure provides for expanding the capacity of the U.S. National Airspace System (NAS), and other airspace networks in the world, in order to meet anticipated growth in traffic demand and operation diversity. In accordance with the disclosure, aircraft engage in trajectory-based operations (TBOs) in order to reduce transit time and increase predictability; and further, observed weather information and probabilistic forecasts are assimilated into the decision making process of flight crews and air traffic controllers in order to minimize weather impact. The disclosure provides a flight deck interface design that supports the display of predictive weather forecasts, used in conjunction with tools that enable in-flight trajectory planning Specifically, three plausible methods for displaying predictive weather forecasts are disclosed, together with data pertaining to their usability in a part-task context.

Being on different sides of the same team, controllers and pilots have different needs for predictive weather forecast information. Controllers are concerned with the impact of hazardous weather on a larger scale, particularly how route blockage by weather is going to alter traffic flow and reduce airspace capacity. Pilots, however, are concerned with the impact of hazardous weather on a smaller, local scale, specifically whether their flight's trajectory, determined before departure, can still be followed, and if not, how it should be modified. The unique challenge for a flight deck predictive weather interface that also supports TBO is that it needs to be capable of allowing pilots to translate weather avoidance decisions into flight plan changes, and to implement these changes and communicate them to the controller.

The conventional pilot-aircraft interface in use today, the Flight Management System (FMS), can be improved in accordance with the disclosure. On modern flight decks, pilots interact with the FMS through the Control Display Unit (CDU), which has a text-based display, and which utilizes an alphanumeric input method. Simply communicating a flight trajectory to the controller, in tracks and navigation aids, is difficult for a flight deck not equipped with an advanced data communication system such as FANS-IA. Moreover, there is difficulty in planning and constructing 4D trajectories to go around weather while conforming to TBO imposed constraints.

In accordance with the disclosure, the inherently spatiotemporal nature of navigation and trajectory planning is improved by providing a direct manipulation interface for manipulating the display of predictive weather forecasts, and at the same time supporting graphical in-flight trajectory planning. An operator uses an interface to interact with a system at three cognitive levels: skill-based, rule-based, and knowledge-based. The skill-based level describes the level at which the operator acts using the provided methods to send commands and cause state changes. The rule-based level describes the level at which the operator uses cues or feedback provided by the interface to determine what actions to take at the skill-based level. The knowledge-based level describes the level at which the operator conducts abstract reasoning to form a mental model of the system behind the interface in order to interpret the cues and feedback.

While examples provided herein relate to aircraft, it should be understood that the disclosure provides methods and apparatus which are useful to any vehicle which must navigate through traffic or obstructions, whether or not the obstructions are independently moving, while avoiding disadvantageous weather, specifically including land craft, spacecraft, and watercraft, of all types existing or hereinafter developed.

A principle idea behind ecological interface design (EID) is to design an interface such that whatever an operator needs to accomplish at each of the three levels is directly supported by the interface itself. For example, one can consider the task of examining predictive weather forecasts for weather avoidance. In accordance with the disclosure, pilots are provided forecast information pertaining to, throughout an upcoming interval of time, where their aircraft will be relative to where the storms are expected to be: and whether their aircraft may come close to the storms at any point in that time interval. Text-based forecast data, such as that provided by the CCFP, could not be readily translated by pilots into information that allows them to envision the future. The disclosure provides the kind of support pilots might desire in such a situation, and more particularly, dynamically displays both predicted aircraft movement and weather development in a 3D space, and thus pilots are able to visualize future conditions with respect to their aircraft.

As such, the knowledge-based level of processing demanded by the interface matches that of the pilot's operational environment, the surrounding airspace. Furthermore, pilots can see their aircraft represented in the interface and are able to control its spatiotemporal trajectory, just as they do when flying through the airspace, the interface supports the skill-based and rule-based levels directly. The disclosure provides a direct manipulation interface (system 100 of the disclosure) that supports in-flight 4D trajectory planning and the viewing of predictive weather forecasts.

Figure 1:
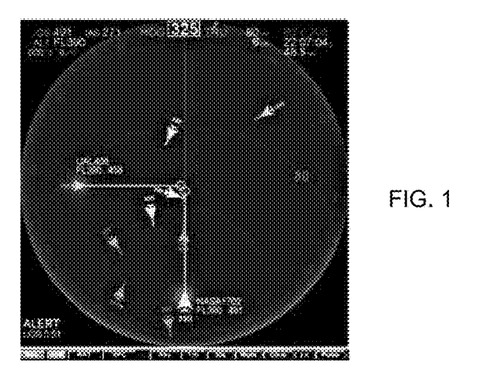
FIG. 1 depicts a Cockpit Situation Display.
Figure 2:
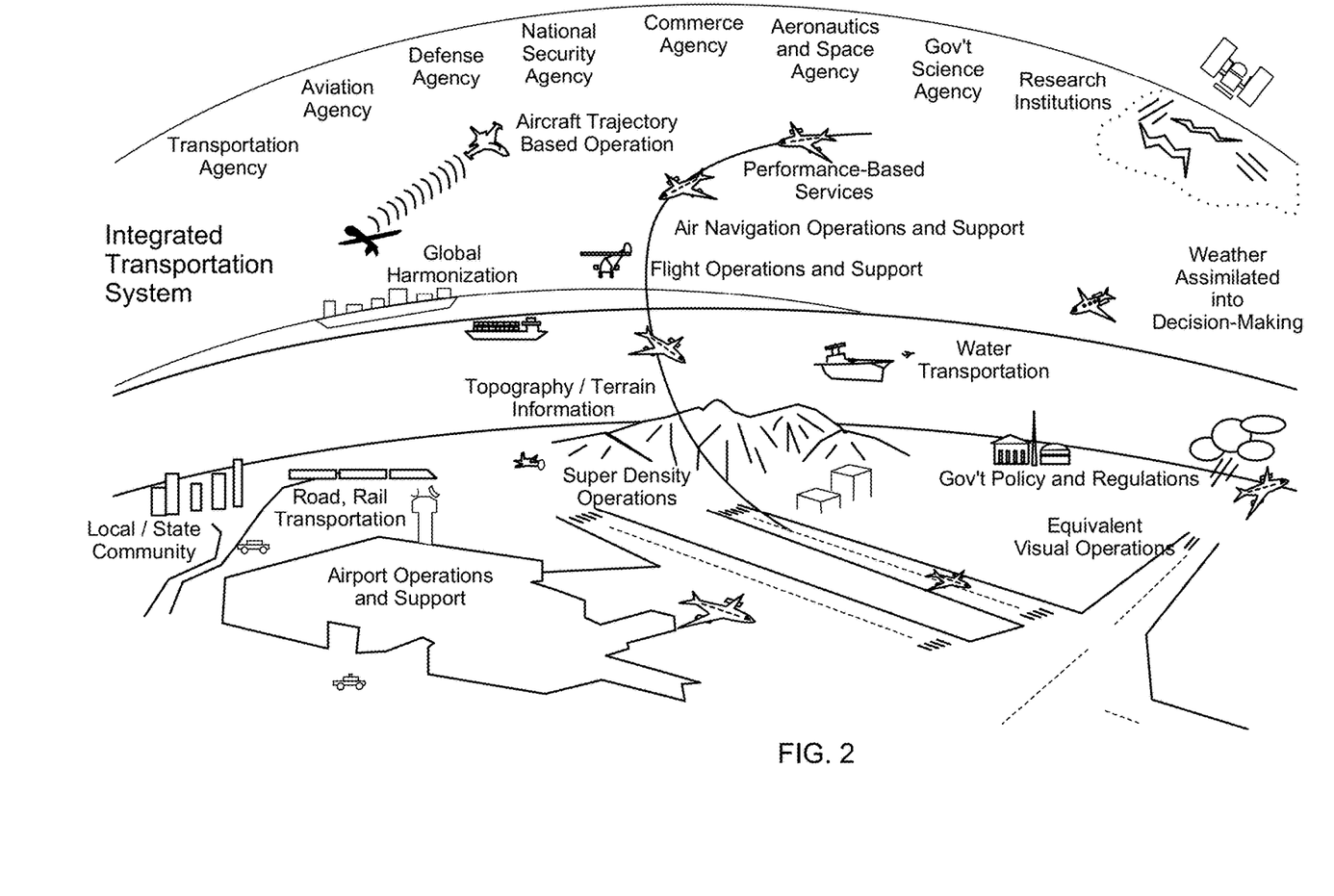
FIG. 2 illustrates the various modalities and entities which cooperate and benefit from the improved flight deck weather avoidance of the disclosure.

The Cockpit Situation Display (CSD), an extension of a Cockpit Display of Traffic Information (CDTI), is an interactive display prototype, shown in FIG. 1 that has been in development in the Flight Deck Display Research Laboratory at NASA Ames Research Center. The CSD supports both traditional 2D and advanced 3D visualization models, and depicts the 4D interrelationship of traffic, terrain, and weather using a cylindrical volume metaphor. Designed to provide the basis for 4D TBO, the CSD also includes the Route Assessment Tool (RAT) which is integrated with the aircraft's Flight Management System (FMS), and allows for in-flight trajectory replanning. A standard computer mouse is presently used to interact with the CSD prototype, although other input devices can be used.

The RAT adopts the principle of a direct manipulation interface providing the functionality to create and visualize in-flight route modifications, downlink proposed route modifications to Air Traffic Control (ATC), receive route modifications from ATC, and execute modifications. The RAT supports the addition of waypoints at arbitrary latitudes-longitudes, and deletion of waypoints, through both clicking, and dragging-and-dropping mouse operations. For each waypoint, pilots can also adjust an associated flight altitude and speed, thus enabling 4D trajectory in-flight planning.

Figure 3:
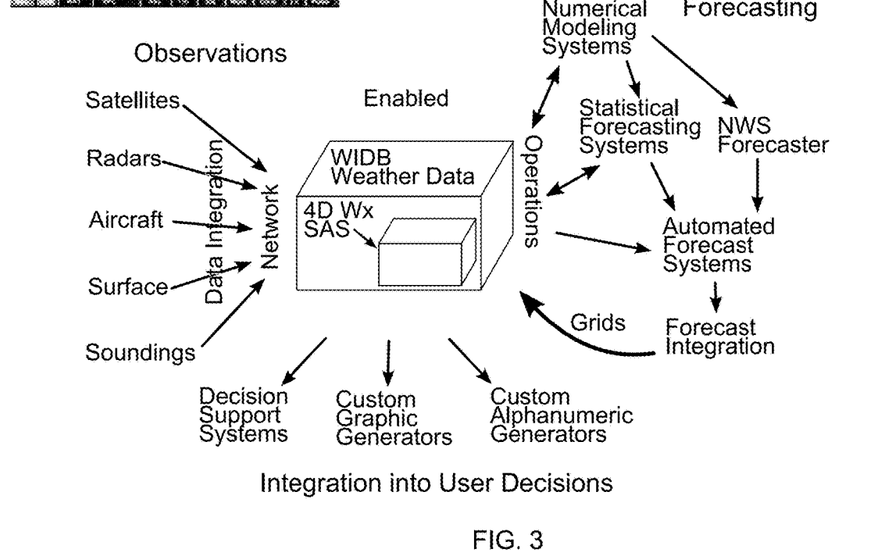
FIG. 3 illustrates a conceptual model for implementing the flight deck weather avoidance of the disclosure.
Figure 4:
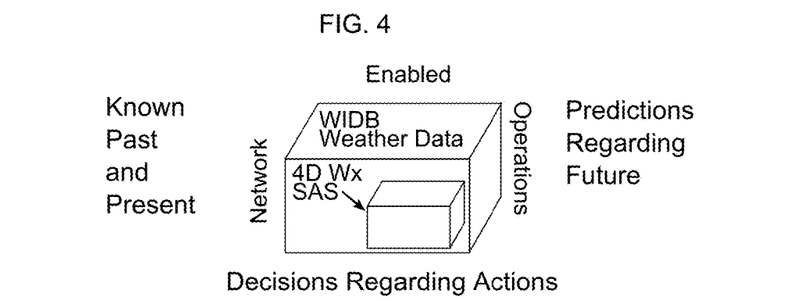
FIG. 4 illustrates a conceptual summary of a process of the disclosure.

With reference to FIG. 3, exemplary modes of observing the flight environment are shown, together with exemplary forecasting inputs, which are analyzed by a database, in accordance with the disclosure. The analyzed data is prepared and presented by a variety of methods, which may be perceived by flight personnel in the flight deck, and which may be integrated into decision, including for example conducting route planning to avoid weather which may tend to create a hazardous, uncomfortable, or inefficient flight. FIG. 4 summarizes that the disclosure contemplates using what is known about past and present flight conditions, traffic, and weather, for example, and synthesizing this information with what may be predicted about these elements, and then representing the synthesized result in a format that flight personnel may use effectively, for example in a 3D or 4D format, as described further herein.

Figures 5A, 5B, 5C:
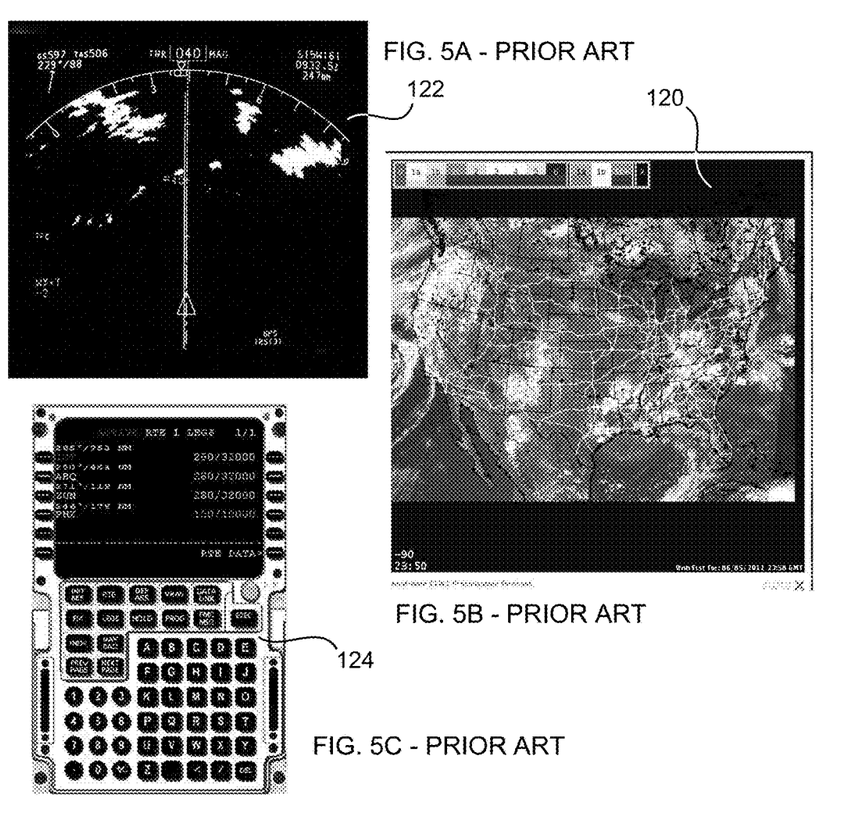
FIG. 5A-C illustrate the PRIOR ART, with respect to information which may be presented in the flight deck of an aircraft.
Figure 6:
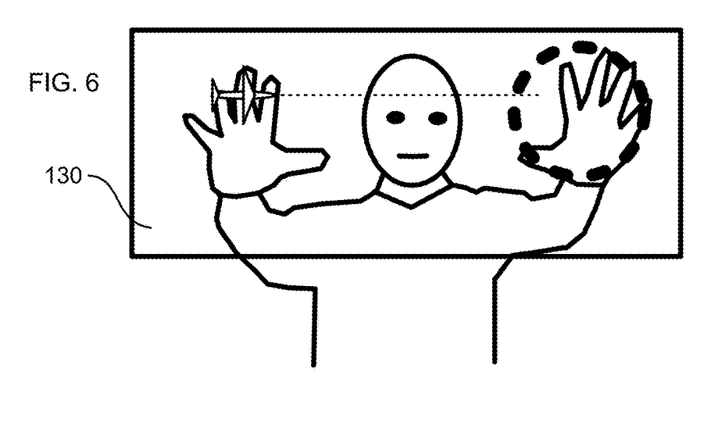
FIG. 6 illustrates a direct manipulation flight deck interface in accordance with the disclosure.

FIG. 5 illustrates a snapshot of certain instrumentation within a prior art Boeing 747-400ND, taken in this example at night at a location between Sydney and Fiji, en route to SFO airport. It may be seen that there are separate displays, wherein one display 120 illustrates satellite weather data, another display 122 depicts radar data with respect to the aircraft, and a third display 124 presents text information pertaining to in-flight trajectory planning In FIG. 6, one possible flight deck control method is illustrated, wherein flight personnel may interact with a display 130 using touch and or gestures, to change a view of flight conditions, or to change or recalculate a flight path based on, for example, weather, geographic, or traffic information synthesized in accordance with the disclosure. Thus, a direct manipulation interface is provided that supports the manipulation of the display of predictive weather forecasts and graphical in-flight trajectory planning.

An exemplary concept and implementation of the direct manipulation interface may be seen in Table 1.

TABLE 1

| Direct Manipulation Interface | | |
|---|---|---|
| | Concepts | Implementation |
| skill-based | use provided methods to send commands and cause state changes in the system | Able to view ownship represented in the interface and control its spatio- |

TABLE 1-continued

| Direct Manipulation Interface | | |
|---|---|---|
| | Concepts | Implementation |
| rule-based | determine what actions to take at the skilled-based level based on cues and feedback from the system | temporal trajectory, in ways similar to flying through the airspace |
| knowledge-based | form a mental model of the system to help interpret cues and feedback | dynamically display both predicted aircraft position and weather development in a virtual 3D airspace |

Figure 7:
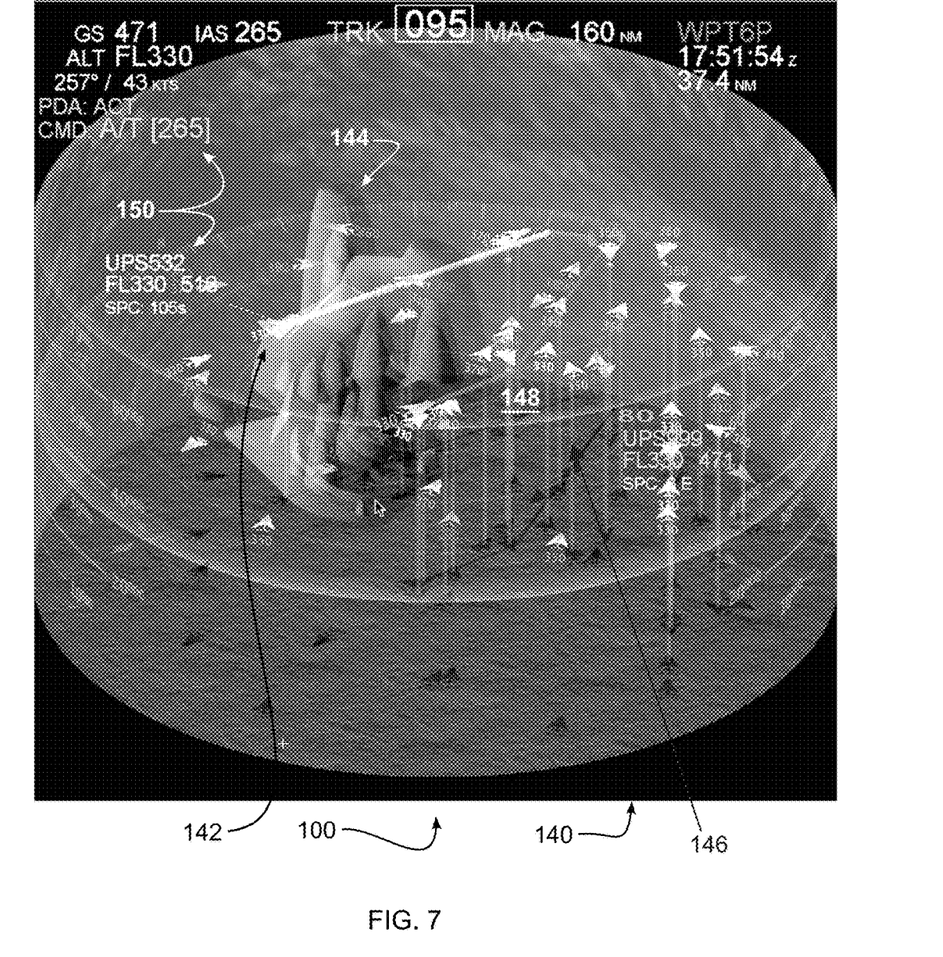
FIG. 7 illustrates a 3D/2D graphical presentation including visual representations of terrain, traffic, weather, and the subject aircraft (ownship)

In FIG. 7, a display in accordance with the disclosure includes a Cockpit Situation Display (CSD) providing CD&R (conflict detection and resolution) and route planning functionalities. As may be seen, the display 140 depicts ownship 142 in 3D space together with a 3D model of terrain 144, weather 146, and surrounding traffic 148. Relevant numerical data 150 is additionally presented. Display 140 can be accompanied by other 2D data or images. Thus, the display may include one or all of 3D terrain and traffic, 2D and 3D weather, CD&R, and a Route Assessment Tool (RAT).

Figures 8, 9:
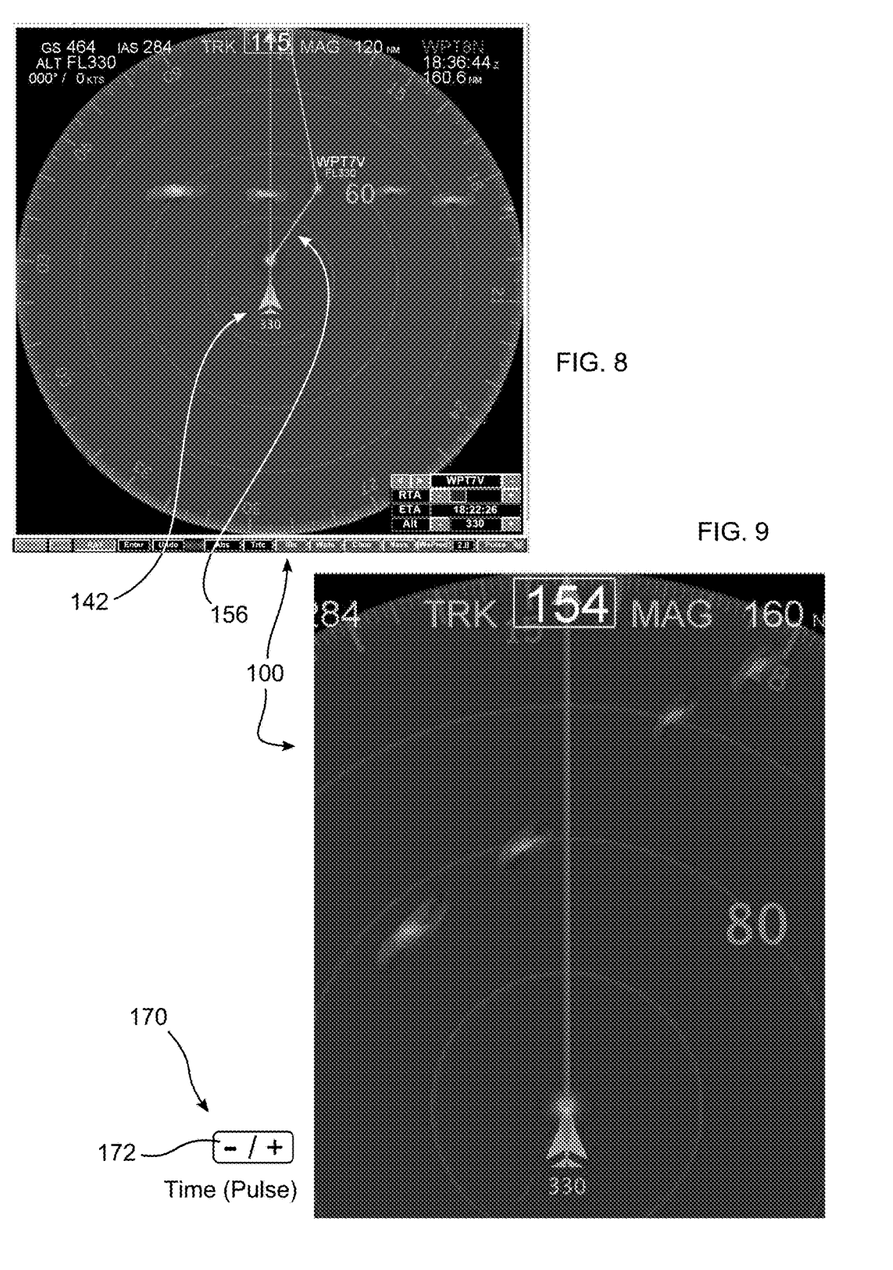
FIG. 8 illustrates a display in accordance with a Route Assessment Tool (RAT) of the disclosure.
FIG. 9 illustrates a pulse type display in accordance with the disclosure.

FIG. 8, illustrates the Route Assessment Tool (RAT), which provides a direct manipulation interface for route planning and modification. The RAT provides the ability to create and visualize in-flight route modifications with respect to ownship 142, submit proposed route modifications to ATC (air traffic control), and to receive and execute route modifications. The direct manipulation can include, for example, a single click waypoint creation (e.g. 156) at arbitrary positions along a trajectory, drag-and-drop waypoint repositioning, and single-click waypoint elimination.

In accordance with the disclosure, three methods for displaying predictive weather can be used for simple monitoring, or in conjunction with the RAT, for route planning. The visual depictions of the current and predicted weather are the same under all three methods. Specifically, current weather is depicted in layers of green yellow, and red, resembling the intensity classification used in radar weather images. Predictive weather forecasts are displayed in a semi-transparent gray color, in order to be distinct from the current weather depiction.

The three methods differ primarily in the way the predictive range (how far into the future the prediction goes) is specified, and the interface used to adjust it. In the first method, henceforth referred to as the Pulse method, illustrated in the display shown in FIG. 9, the predictive range is set by clicking the Pulse button 172 on a CSD toolbar 170, that specifies the prediction interval. This predictive interval is incremented in steps of 1 minute by a right mouse button click, and decreased in the same steps by a left mouse button click, although other time periods, and other control methods, may be implemented. In the Pulse method, a user may set the farthest predictive range ahead in time as they deem most useful. Once set, a corresponding extrapolation of predictive weather and aircraft position over the specified time interval into the future is repeatedly shown as synchronous pulses.

When the Pulse method is selected, and the predictive interval is set, a corresponding dynamic synchronous extrapolation of the predicted weather (in gray) and aircraft position (drawn as a blue bead) over the length of the specified time interval into the future is repeatedly shown on the display. Thus, if at time t a pilot engaged the Pulse method, and selected a predictive interval of 6 minutes, he or she would initially see a repeating fast-time prediction going from time t to time t+6. If the pilot left the Pulse method engaged, the starting point (i.e., the representation of the aircraft) would continually move forward, such that, for example, at time t+I, the pilot would be seeing a fast-time prediction going from t+1 to t+7.

In the second method, henceforth referred to as the Slider method, the predictive range is set by a prediction interval-based slider located on the CSD display, in this example at the lower left. When the pilot uses the mouse, or other input device or gesture, to drag the slider to select different time intervals, the blue bead indicating the projected aircraft position, as well as the weather forecasts, will accordingly update to reflect a predicted aircraft position and weather forecast at the specified time interval in the future. The Slider method provides the pilot a method to select and hold in focus an aircraft and weather position at the end of a specific time interval in the future. In contrast to the Pulse example, the pilot can begin an investigation at time t, seeing only the weather forecast for time t+6, and at t+I only seeing the forecast for time t+7.

Figure 10:
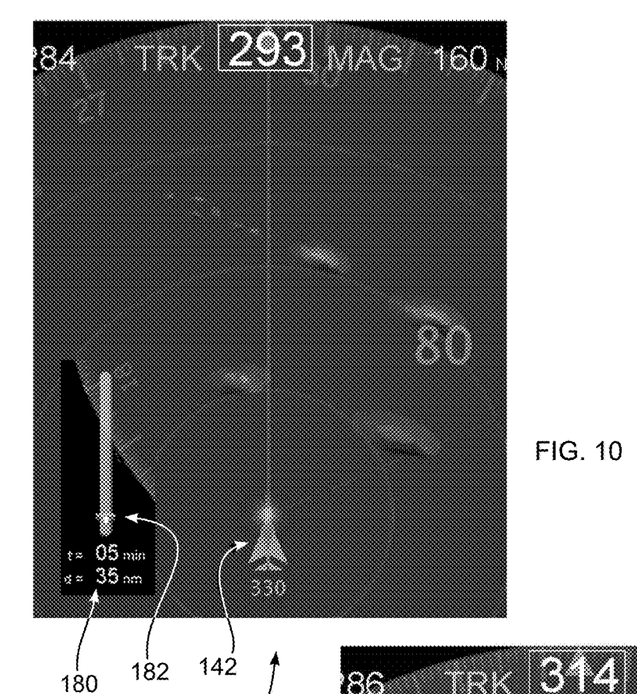
FIG. 10 illustrates a slider type display in accordance with the disclosure.

In FIG. 10, a time based Slider method display is illustrated, wherein a user may set a pinpointed time ahead by adjusting a time slider 180. As time slider 180 is being adjusted by hand, or other gesture, by moving a time indicator 182, the aircraft position indicator (ownship 142) and weather forecast move accordingly, to reflect prediction at the specified time ahead.

In one embodiment, a series of images may appear as frames, in the manner of a video, each frame showing a subsequent predictive snapshot at a given interval. The user can, in one embodiment, select the display speed and a repeat interval.

In the third method, henceforth referred to as the Route method, the predictive range is adjusted by directly manipulating the spatial position of the blue bead along the future planned route of the aircraft. When the pilot moves the bead to a spatial position on his or her existing or proposed trajectory, the time at which the aircraft is expected to reach this point is calculated, and the weather forecast corresponding to this time is then displayed. The main contrast between the Route method, as opposed to the Pulse or Slider methods, is that the Route method is associated with a location, while the other two methods are associated with a time. For example, if a location along the route is selected in the Route mode, a predicted time would initially be ascribed to that location. However, as the aircraft progresses, the predicted time can continuously count down until the pilot changes the location or turns off the prediction.

Figure 11:
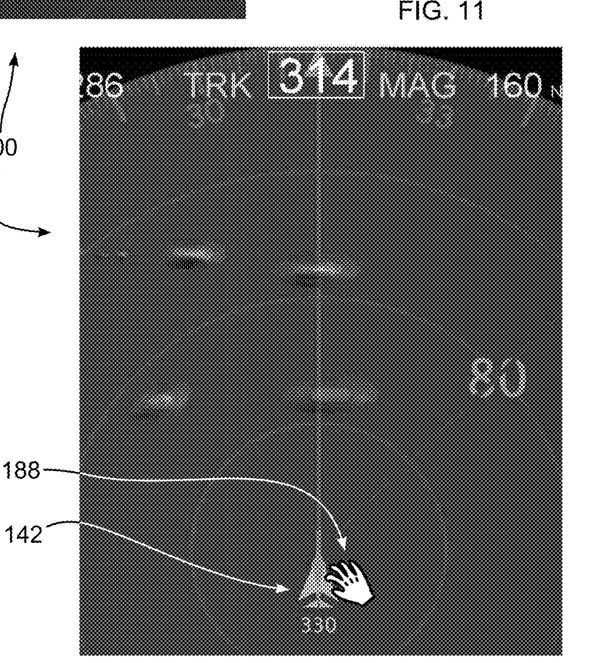
FIG. 11 illustrates a route type display in accordance with the disclosure.

FIG. 11 illustrates a space based Route method type display, wherein users may set pinpointed aircraft position ahead by directly manipulating an aircraft indicator 142 on a display of the route. As a future aircraft position is being manipulated by hand, for example using a cursor icon 188, or other gesture, on route, weather forecast information is visually depicted accordingly to reflect the weather prediction 146 at the specified position ahead.

Features of the predictive weather and route planning viewing methods of the disclosure are summarized in Table 2.

TABLE 2

Predictive Weather Viewing Methods Feature Summary

| Synchronous Pulse | Time-Based Slider | Space-Based Route |
|---|---|---|
| a corresponding extrapolation of predictive weather and aircraft position over the specified time interval into the future is repeatedly shown as synchronous pulses | users set pinpointed time ahead by adjusting a time slider | users set pinpointed aircraft position ahead by directly manipulating an aircraft indicator on route |
| advantageous for hands-free viewing/monitoring | advantageous for inspecting/monitoring a specific time interval ahead | advantageous for inspecting/monitoring a specific location of close weather/aircraft proximity ahead |

A part-task experiment was conducted evaluating three methods of the disclosure for presenting weather forecasts with tools that support trajectory planning. The experiment focused on evaluating the usability of the methods for supporting the viewing of predictive weather forecasts, for weather avoidance decisions. To simplify matters, only a single aircraft (ownship) was present in the scenarios, and the trials terminated upon completing the route modification. Traffic was not a consideration in this experiment, and perfect predictions were assumed.

Twenty-one transport pilots with 1000 to over 5000 hours of high-altitude flight experience participated in the study and were compensated for their time. Among them, 18 pilots had experience using the CSD in previous studies, but none had experience with the weather prediction tools. The study was conducted using an IBM-compatible desktop personal computer (PC) equipped with a 30 inch LCD display. Pilots manipulated the CSD using a computer mouse. Eye movements were monitored using a head-mounted camera-based eyetracking system (Applied Science Laboratory, Model 501). The system samples eye position at 120 Hz.

On each trial, pilots were presented with a weather encounter scenario, in en route environments, and were asked to modify the existing trajectory if they found it unsafe, according to predictive weather forecasts. In addition to the three methods for viewing predictive weather forecasts, the distance of the current ownship was manipulated with respect to the location, on the initial trajectory, where ownship was expected to reach the closest point of approach (CPA) to weather.

These distances could be either 40 nm (−5 min) or 80 nm (−10 min). At either of the distances, ownship could encounter hazardous weather in one of four ways: Middle, Initially Clearing Gap, Initially Clearing Edge, and Clear Later. With respect to a Middle encounter, the existing 3D ownship trajectory, and the 4D forecast ownship trajectory, penetrated one of the storm cells near the center of a storm front. It was designed such that it would be very inefficient to take a large detour and bypass all of the storm cells, so that pilots would be more tempted to find an alternative route through the gaps between storm cells. Pilots were tasked, inter alia, with finding a safe and efficient re-route around weather.

For the Initially clearing gap encounter, the existing 3D ownship trajectory was initially clear of the given line of storm cells, passing through a gap in the current weather depiction. However, the forecast 4D trajectory was predicted to penetrate the storm cells. In the Initially clearing edge encounter, the existing 3D ownship trajectory appeared to clear the leading or trailing edge of a line of storm cells in current weather depictions, but the forecast 4D trajectory was predicted to penetrate the storm cells. With respect to the Clear later encounter, the existing 3D ownship trajectory penetrated storm cells in current weather depictions, but the forecast 4D trajectory was predicted to be clear of weather.

Trial scenarios were generated using three types of weather patterns in order to increase the variability of the scenarios. A total of 144 unique trial scenarios were generated, with 48 trials in each of the predictive weather viewing conditions. The 48 trials varied according to the three weather patterns, four encounter types and two distances.

Each trial began with a crosshair fixed at the center of a blank CSD display. After a variable amount of time, between 2-4 seconds, the trial display appeared with ownship in the center. This variable delay was attributed to the time taken by the hardware and software to render and present the weather cell objects in 3D. The display range was set to 320 nm (160 miles in front and behind ownship), with the trajectory extending upward ahead of ownship to the edge of the display. Storm cells were located at variable distances ahead of ownship in the upper half of the display. Pilots were asked to determine if a given flight trajectory was safe and, if the trajectory was determined to be unsafe, find a safe and efficient re-route around weather using the shortest amount of time. They were instructed to use their company's standard operation procedure (SOP) for avoiding hazardous weather. Each trial ended when the pilot executed the modified flight trajectory using the RAT.

On trials where pilots determined that no modification was necessary, they activated the RAT and executed the existing trajectory to terminate the trial. Following the end of a trial, a dialog box appeared in the center of the display with an OK button. As soon as the pilot clicked the OK button, the next trial began. The 144 trials were divided into three blocks, one for each weather viewing method. The order of the blocks was counterbalanced between pilots. Pilots received the corresponding training for a particular method right before that block of trials. The training involved verbal instructions and hands-on exercises, followed by self-paced practice runs. Pilots were asked to practice until they felt comfortable using the newly learned method. Before testing began in each block, pilots went through an eyetracker calibration procedure to ensure accurate recordings.

After pilots completed all blocks of trials, they filled out an online questionnaire designed to solicit their subjective evaluation of the three viewing methods. On all trials the altitude of ownship was preset to 33000 feet; and the speed was preset to around 464 knots. Because it was assumed that the type of weather avoidance being studied here takes place en route, pilots were instructed to view the display in 2D and perform only lateral maneuvers even though CSD and RAT support 3D operations. No wind information was provided; pilots were instructed to infer wind direction based on the forecasted movement of the storm cells. The experiment provided up to 40 minutes of weather forecasts. The prediction was assumed to be 100% accurate.

Results for 3 of the 21 pilots were excluded: one due to excessive conversation during testing, two others due to poor tracking quality. Results presented herein are thus based on the remaining 18 pilots, who together fulfilled a complete counterbalancing of the three viewing method orders. The present disclosure was found to provide a good predictive weather viewing interface for a flight deck, by generation good alternative safe flight trajectories around hazardous weather. We examined the time taken to generate route modifications, and the quality of the route modifications.

A typical work flow on a trial involved first using the provided predictive weather viewing method to determine whether a route modification was necessary, and when needed, generating an alternative safe trajectory around weather using the RAT. Therefore, there was a period of time where predictive viewing methods were used primarily for weather evaluation, independent of route modification, and another period of time when the viewing methods were used in conjunction with route modification.

The evaluation time was measured from when ownship and weather were shown, to when the RAT was first activated, and modification time from when the RAT was first activated, to when a route (new or existing) was executed. Because some pilots adopted the strategy of activating the RAT without having evaluated the predictive weather forecasts first, we also took the sum of the evaluation and modification time as a measure of weather avoidance efficiency in general.

The results of averaged evaluation time, modification time, and total time by viewing methods, distance to weather, and weather encounter type are summarized in Tables 3-5. The results were subjected to repeated-measure Analyses of Variance (ANOVA) with within-subject factors of viewing method (Pulse, Slider, and Route); distance to weather (40 and 80 nm); and encounter type (Middle, Initially clearing gap, Initially clearing edge, and Clear later). With regard to evaluation time, there were significant main effects of distance, $F(1,17)=19.22$, $p<0.0005$, and encounter type, $F(3,51)=11.26$, $p<0.0005$.

Specifically, when the distance to encounter weather on the existing trajectory was close (40 nm), pilots spent less time evaluating weather, and proceeded quickly to modify the existing trajectory using the RAT (10.0 sec at 40 nm vs. 10.8 sec at 80 nm). Pilots also spent a relatively longer time evaluating weather conditions prior to activating the RAT when the given trajectory went through the middle of a line of storms (11.3 sec on average), whereas they spent relatively less time when the given trajectory initially cleared the edge of the line of storm cells (9.2 sec on average). There was no significant effect of the viewing method.

TABLE 3

Mean Evaluation Time (Sec) In The Three Viewing Conditions By Distance And Encounter Type

| Viewing Method | Encounter Type | | | |
|---|---|---|---|---|
| | Middle | Initially clearing gap | Initially clearing edge | Clear later |
| Pulse | | | | |
| 40 nm | 11.3 | 10.6 | 9.2 | 10.1 |
| 80 nm | 11.7 | 11.9 | 9.6 | 11.3 |
| Slider | | | | |
| 40 nm | 11.2 | 10.0 | 7.9 | 9.0 |
| 80 nm | 10.6 | 10.3 | 9.2 | 9.9 |
| Route | | | | |
| 40 nm | 11.0 | 10.5 | 9.4 | 10.0 |
| 80 nm | 11.7 | 11.8 | 10.1 | 11.3 |

TABLE 4

Mean Modification Time (Sec) In The Three Viewing
Conditions By Distance And Encounter Type

| Viewing Method | Encounter Type | | | |
| --- | --- | --- | --- | --- |
| | Middle | Initially clearing gap | Initially clearing edge | Clear later |
| Pulse | | | | |
| 40 nm | 24.9 | 19.8 | 14.7 | 12.7 |
| 80 nm | 23.6 | 23.5 | 14.2 | 13.9 |
| Slider | | | | |
| 40 nm | 26.2 | 21.9 | 16.2 | 12.2 |
| 80 nm | 23.9 | 22.2 | 14.7 | 11.9 |
| Route | | | | |
| 40 nm | 23.5 | 19.0 | 15.5 | 12.0 |
| 80 nm | 21.8 | 20.0 | 13.7 | 13.1 |

TABLE 5

Mean Total Trial Time (Sec) In The Three Viewing
Conditions By Distance And Encounter Type

| Viewing Method | Encounter Type | | | |
| --- | --- | --- | --- | --- |
| | Middle | Initially clearing gap | Initially clearing edge | Clear later |
| Pulse | | | | |
| 40 nm | 36.1 | 30.4 | 24.0 | 22.8 |
| 80 nm | 35.4 | 35.4 | 23.8 | 25.2 |
| Slider | | | | |
| 40 nm | 37.4 | 31.9 | 24.1 | 21.2 |
| 80 nm | 34.5 | 32.5 | 23.9 | 21.8 |
| Route | | | | |
| 40 nm | 34.6 | 29.5 | 24.8 | 22.0 |
| 80 nm | 33.5 | 31.7 | 23.7 | 24.4 |

Figure 12:
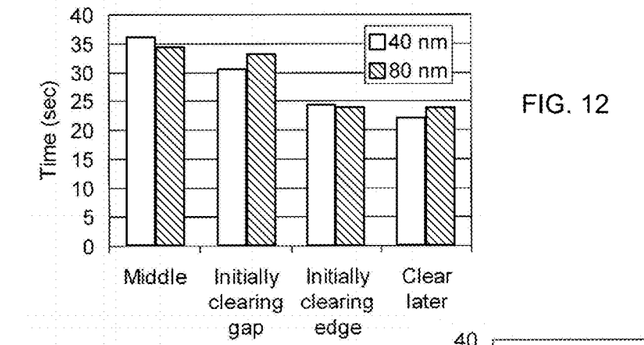
FIG. 12 depicts a graphical representation of speed results in accordance with the disclosure, at varying distances to weather.

A graphical representation of speed is shown in FIG. 12, wherein total time is defined as evaluation plus modification. Findings include a main effect of encounter type, and an interaction between encounter type and distance to weather. Without being bound to any particular theory, implications are that a shorter time horizon made it more difficult to modify trajectories going through the middle of a storm, but easier to handle those trajectories initially passing through gaps.

The ANOVA results on route modification time showed a slightly different pattern to those on evaluation time. There was an effect of encounter type, $F(3,51)=41.48$. $p<0.0005$. It appeared that pilots took longer to generate alternative safe trajectories around weather when the initial trajectory went through the middle of a line of storm cells (around 22.5 sec on average) than when the initial trajectory cleared the outer edge of storms or would entirely clear them as the aircraft approached (around 13.7 sec on average). The effect of distance to weather came in the form of an interaction with encounter type, $F(3,51)=3.71$, $p<0.05$; trajectory modifications were easier with different encounter types depending on the distance to weather. The effect of viewing method was a marginal interaction with encounter type $F(6,102)=1.92$, $p=0.08$.

Figure 13:
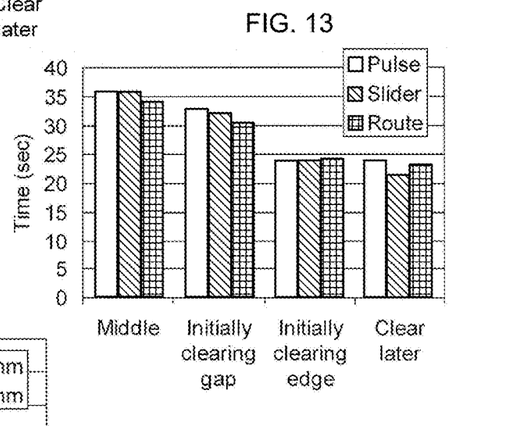
FIG. 13 depicts a graphical representation of speed results based on each prediction method of the disclosure.

FIG. 13 provides a graphical illustration of speed for each of three methods. Findings includes an interaction between viewing method and encounter type. Without being bound to a particular theory, there appears to be a small advantage in using the route method when the encounter type requires more difficult maneuvers.

The ANOVA results on the total weather avoidance time (evaluation plus modification time) showed an effect of encounter type, $F(3,51)=40.56$, $p<0.0005$, as well as an interaction between distance and encounter type $F(3,51)=4.41$, $p<0.05$. It appears that short time horizons made it more difficult to evaluate and modify a trajectory initially going through the middle of a storm cell, but made it easier to handle a trajectory initially going through the gap between cells. There was a significant interaction between viewing method and encounter type, $F(6,102)=2.31$, $p<0.05$. It was a small tendency for the Route method to produce relatively faster route evaluation and modification time when the encounter type required more difficult maneuvers (e.g. middle and initially clearing gap).

The quality of route modification was evaluated in terms of the increase in length of the modified path compared to the original path, and the new path's proximity to weather. The instant disclosure provides a good predictive weather viewing interface which makes it easier to find the shortest reroute around weather, at a safe margin. The ANOVA results on path stretch (summarized in Table 6) showed a significant main effect of encounter type, $F(3,51)=13.95$, $p<0.005$, and an interaction between distance to weather and encounter type, $F(3,51)=4.72$, $p<0.05$. As anticipated, a flight trajectory that starts out clearing the edge of a line of storm cells required the least amount of modification to be clear of the storm cells (5.9 nm on average), whereas an initial trajectory penetrating a line of storm cells may prompt a pilot to make large detours to avoid them altogether, resulting in the greatest increase in path length (28.8 nm on average).

Figure 14:
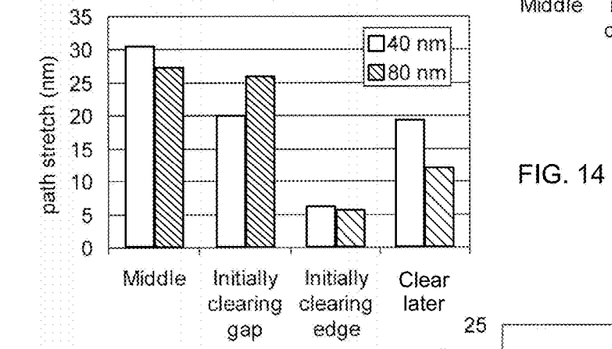
FIG. 14 depicts a graphical representation of path stretch results.

A graphical representation of the results with respect to path stretch is provided in FIG. 14, wherein path stretch can be considered to be an increase in length of a modified path compared to an original path. FIG. 14 shows a main effect of encounter type, and an interaction between encounter type and distance to weather. Without being bound to any particular theory, one possible implication is that less path stretch is found with more imminent weather encounter, suggesting pilots were more willing to trade off risk for efficiency.

TABLE 6

Mean Path Stretch (Nm) In The Three Viewing
Conditions By Distance And Encounter Type

| Viewing Method | Encounter Type | | | |
| --- | --- | --- | --- | --- |
| | Middle | Initially clearing gap | Initially clearing edge | Clear later |
| Pulse | | | | |
| 40 nm | 35.0 | 19.7 | 7.0 | 14.3 |
| 80 nm | 24.1 | 26.0 | 6.3 | 11.9 |
| Slider | | | | |
| 40 nm | 25.8 | 22.6 | 5.8 | 9.7 |
| 80 nm | 34.9 | 29.1 | 5.6 | 11.7 |
| Route | | | | |
| 40 nm | 30.4 | 17.5 | 5.4 | 9.0 |
| 80 nm | 22.5 | 22.7 | 5.4 | 12.5 |

The interaction between distance to weather and encounter type reveals that when weather encounter was imminent (40 nm to CPA to weather), pilots made shorter route modifications than when the weather encounter was much further away, particularly in the condition where the initial trajectory started out being clear of weather (i.e., Initial clearing gap). In general, the increase in overall path length required to avoid weather grows as one approaches it more closely. Therefore, without being bound by any particular theory, it may be that pilots were more willing to trade-off risk for efficiency, when the safer path was very inefficient. Alternatively, the pilots may have been willing to take a little more risk to fly between cells when the time to find and execute a new path was more limited (5 min versus 10 min).

The ANOVA results on the new path's proximity to weather support the above conjecture. These results (summarized in Table 7) showed main effects of distance to weather $F(1,17)=16.25$, $p<0.001$, and encounter type $F(3, 51)=162.39$, $p<0.0001$, as well as an interaction between distance to weather and encounter type, $F(3,51)=90.61$, $p<0.0001$. When ownship was closer to encountering hazardous weather, the modified paths tended to maintain a smaller safety margin. The degree to which pilots were able to maintain the safety margin under the FAA guidance (20 nm) appeared to be closely related to how easy it was to plan an alternative safe trajectory, as indicated by the effect of encounter type. Only when the initial trajectory was already clearing the edge of a line of storm cells did the pilots maintain a safety distance (19.5 nm) close to the 1-AA guidance. In all other encounter situations, the average safety margin was well below the guidance, especially when the initial trajectory penetrated the line of storm cells in the middle and greatly increased the difficulty in maneuvering.

Figure 15:
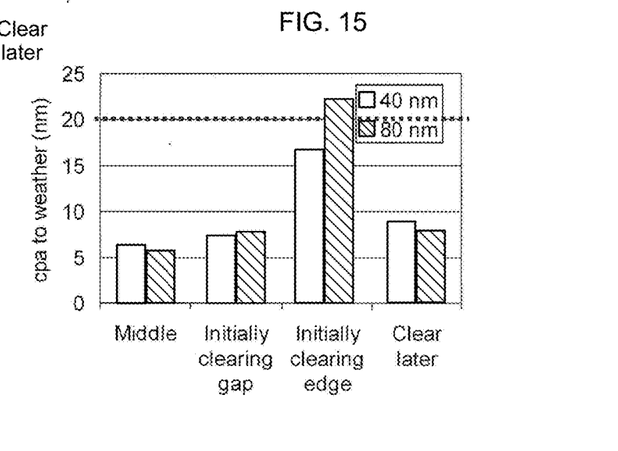
FIG. 15 depicts a graphical representation of CPA to weather.

FIG. 15 graphically represents results with respect to CPA to weather. It is noted that FAA guidance is 20 nm. Findings include a main effect of encounter type, a main effect of distance to weather, and an interaction between encounter type and distance to weather.

TABLE 7

CPA To Weather (Nm) In The Three Viewing Conditions By Distance And Encounter Type

| Viewing Method | Encounter Type | | | |
| --- | --- | --- | --- | --- |
| | Middle | Initially clearing gap | Initially clearing edge | Clear later |
| Pulse | | | | |
| 40 nm | 6.7 | 7.3 | 16.9 | 9.0 |
| 80 nm | 5.8 | 8.0 | 22.7 | 8.0 |
| Slider | | | | |
| 40 nm | 6.3 | 7.4 | 16.7 | 8.9 |
| 80 nm | 6.3 | 7.0 | 22.6 | 8.1 |
| Route | | | | |
| 40 nm | 6.2 | 7.6 | 16.3 | 9.1 |
| 80 nm | 5.3 | 8.4 | 21.7 | 8.1 |

In accordance with the disclosure, pilots are able to evaluate predictive weather forecasts and plan trajectory modifications about equally well using any of the methods. A performance difference specifically related to the methods per se, appears to be in the total time taken for evaluation and modification, wherein the Route method showed a small advantage when difficult maneuvers were demanded. It is likely that differences afforded by the three methods, primarily in terms of the input method for adjusting predictive ranges, were too small compared to the time spent to decide the best course of action around weather.

In testing, the Pulse method had an additional pulsing function while the other two methods did not. The pulsing function could be provided for all three methods regardless of how predictive range is set. Testing pilots indicated that the pulsing function was advantageous, and they additionally indicated speed and smoothness of operation are advantageously maximized. In accordance with the disclosure, in addition to interacting with the trajectory directly, switching between waypoint manipulation and bean (aircraft) position manipulation may be carried out.

While the part-task environment included the minimal amount of setup to simulate en-route weather avoidance, (e.g. no traffic, no wind information, and perfectly accurate prediction), the findings on how path stretch and weather CPA were affected by distance to weather, and by encounter type, suggest that the task environment produced results that are in accordance with expected pilot behavior when encountering real weather. In fact, here we note one particular finding that potentially sheds light on an aspect of pilot weather avoidance behavior that previously puzzled researchers. DeLaura and Evans examined pilot weather avoidance behavior from actual flights in order to determine deviation strategies and avoidance distances for the purpose of computationally modeling and predicting avoidance decisions [12]. In the paper they acknowledged that not all deviation strategies could be explained by anticipated intensity of weather encounter on the planned trajectory. Specifically. DeLaura and Evans noted a case of weather avoidance where the cause and intent of the deviation were "unclear" (see [12]. FIG. 10). In this example a pilot made a large deviation around a region of benign weather, more than 100 km downwind from the nearest convection cell (see also [13], FIG. 4). A similar strategy of weather avoidance behavior was observed in the present study during some of the "Clear later" scenarios. "Clear later" scenarios were constructed such that the initial trajectory, though appearing obstructed by current weather, would be clear of the projected edge of a line of storms by approximately 10 nm, a margin greater than what pilots sometimes maintain when passing between storm cells. The initial idea behind this type of scenarios was to see how long it would take for the pilots to realize that no modification was necessary using the three viewing methods. A post-hoc examination of these trials shows that on most of these trials pilots still made modifications to keep the trajectories further away from weather, often keeping a 20 nm margin. The reasoning behind the maneuver observed by DeLaura and Evans [12. 13] may be inexplicable when avoidance decisions are to be interpreted solely based on Vertically Integrated Liquid (VIL) levels and relative radar echo top heights, as in the Convective Weather Avoidance Model (CWAM).

Pilot weather avoidance behavior from the present study showed pilots modifying their flight trajectories to be further away from any radar echo to maintain the 20 nm recommended margin, if the opposite side of the airspace is clear of weather. In accordance with the disclosure, pilots may exploit open airspace for increased safety, enabling pilots to use heuristics to exploit opportunities present in a given encounter. While the disclosure provides additionally predictive abilities for the pilot, they can continue to avoid weather in an iterative process if desired, making incremental adjustments and evaluating the results. For example, the Route method can enable pilots to monitor the relationship of ownship to that of weather at a specific location in space ahead. Likewise, the pulsing function of the Pulse method can be very useful for visualizing predicted traffic congestion in the surrounding airspace, particularly if the positions of all aircraft are pulsed together.

The instant disclosure enables pilots to implement a weather avoidance strategy that is affected by distance to weather. The predictive weather forecasts provided herein allow pilots to preview the weather, for example, as far as 320 nm ahead, although substantially farther distances are possible provided adequate data is made available. Prior art airborne weather radars have a useful range, typically, of between 30 to 80 nm. Models developed to predict weather avoidance behavior, such as CWAM [12, 13], that are based on flight data from aircraft equipped with current day weather sensing technologies, can be modified to be used together with the methods of the instant disclosure, to enhance prediction efficacy for longer ranges.

Further in accordance with the disclosure, ground derived storm information is provided to the cockpit to foster consistent deviation behavior from different pilots, improving the ability to predict pilot deviation decisions. For example, pilots could generate more reliable estimates of the aircraft's altitude relative to the storm top, for example when their aircraft is 20-40 nm away from a storm.

Exemplary Computer System

Figure 16:
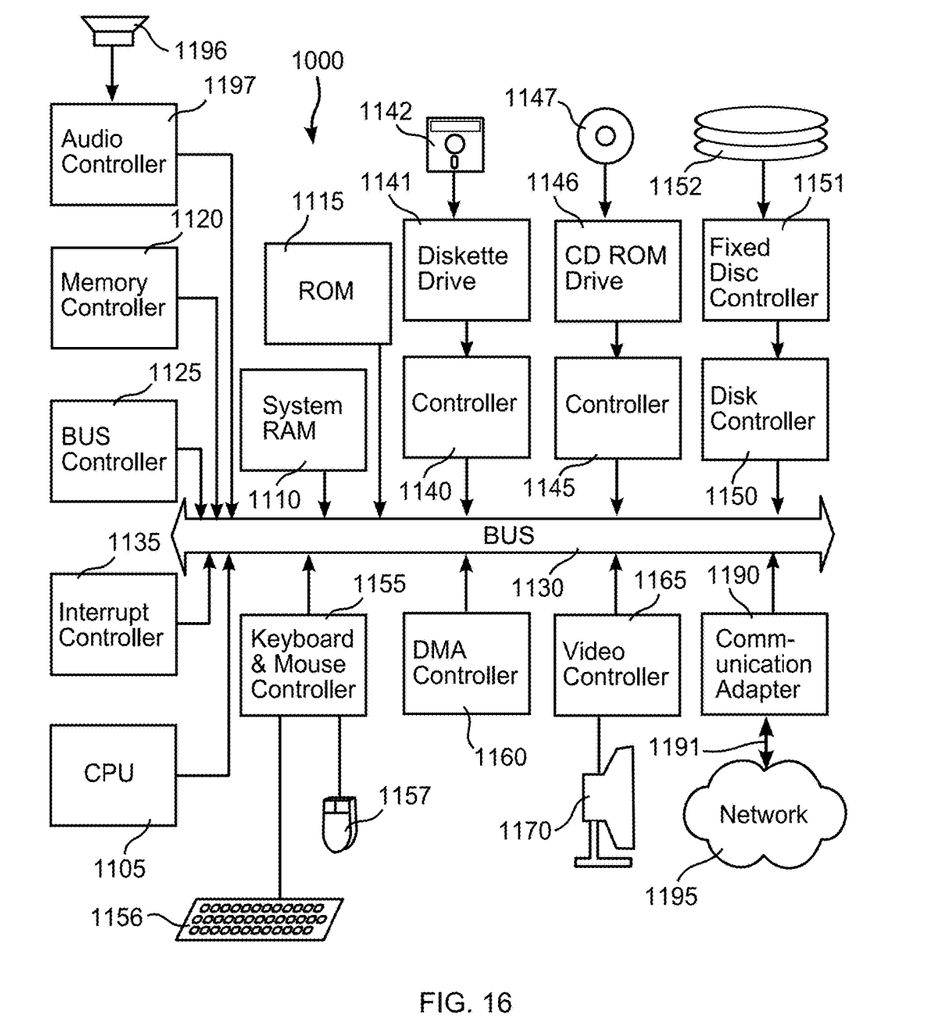
FIG. 16 depicts a system architecture for a computer system of the present invention.

FIG. 16 illustrates the system architecture for a computer system 1000 such as a server, work station, embedded system, avionics system, or other processor on which the disclosure may be implemented. The exemplary computer system of FIG. 16 is for descriptive purposes only. Although the description may refer to terms commonly used in describing particular computer systems, the description and concepts equally apply to other systems, including systems having architectures dissimilar to FIG. 16.

Computer system 1000 includes at least one central processing unit (CPU) 1105, or server, which may be implemented with a conventional microprocessor, a random access memory (RAM) 1110 for temporary storage of information, and a read only memory (ROM) 1115 for permanent storage of information. A memory controller 1120 is provided for controlling RAM 1110.

A bus 1130 interconnects the components of computer system 1000. A bus controller 1125 is provided for controlling bus 1130. An interrupt controller 1135 is used for receiving and processing various interrupt signals from the system components.

Mass storage may be provided by diskette 1142, CD or DVD ROM 1147, flash or rotating hard disk drive 1152. Data and software, including software 400 of the disclosure, may be exchanged with computer system 1000 via removable media such as diskette 1142 and CD ROM 1147. Diskette 1142 is insertable into diskette drive 1141 which is, in turn, connected to bus 1030 by a controller 1140. Similarly, CD ROM 1147 is insertable into CD ROM drive 1146 which is, in turn, connected to bus 1130 by controller 1145. Hard disk 1152 is part of a fixed disk drive 1151 which is connected to bus 1130 by controller 1150. It should be understood that other storage, peripheral, and computer processing means may be developed in the future, which may advantageously be used with the disclosure.

User input to computer system 1000 may be provided by a number of devices. For example, a keyboard 1156 and mouse 1157 are connected to bus 1130 by controller 1155. An audio transducer 1196, which may act as both a microphone and a speaker, is connected to bus 1130 by audio controller 1197, as illustrated. It will be obvious to those reasonably skilled in the art that other input devices, such as a pen and/or tablet, Personal Digital Assistant (PDA), mobile/cellular phone and other devices, may be connected to bus 1130 and an appropriate controller and software, as required. DMA controller 1160 is provided for performing direct memory access to RAM 1110. A visual display is generated by video controller 1165 which controls video display 1170. Computer system 1000 also includes a communications adapter 1190 which allows the system to be interconnected to a local area network (LAN) or a wide area network (WAN), schematically illustrated by bus 1191 and network 1195.

Operation of computer system 1000 is generally controlled and coordinated by operating system software, such as a Windows system, commercially available from Microsoft Corp., Redmond, Wash. The operating system controls allocation of system resources and performs tasks such as processing scheduling, memory management, networking, and I/O services, among other things. In particular, an operating system resident in system memory and running on CPU 1105 coordinates the operation of the other elements of computer system 1000. The present disclosure may be implemented with any number of commercially available operating systems.

One or more applications, such as an HTML page server, or a commercially available communication application, may execute under the control of the operating system, operable to convey information to a user.

Non-Limiting Examples

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

The invention claimed is:

1. A method of providing visual depictions of predictive weather information for in-route aircraft trajectory planning, the method comprising:
   providing an onboard aircraft computer system having a processor and a graphical display;
   displaying current weather information for time T on the graphical display;
   displaying current aircraft position information for time T on the graphical display;
   displaying current aircraft trajectory information on the graphical display;
   selecting a predictive time interval X where X is expressed in terms of minutes, the predictive time interval X selected on the aircraft computer system;
   generating predictive weather information using the processor of the aircraft computer system, the predictive weather information extrapolated from known weather forecasts received by the onboard aircraft computer system, the predictive weather information generated for a plurality of time increments from time T to time T+X;
   generating predictive aircraft position information using the processor of the aircraft computer system, the predictive aircraft position information generated for each time increment from time T to time T+X;
   manipulating an user interface function on the aircraft computer system to sequentially display on the graphical display the current aircraft position information relative to the current weather information for time T and the predictive aircraft position information relative to the predictive weather information for each time increment from time T to time T+X;

using a route assessment tool on the aircraft computer system to generate an in-flight trajectory change to the current aircraft trajectory information, the in-flight trajectory change based on predictive aircraft position information and predictive weather information such that the in-flight trajectory change avoids weather storms, the in-flight trajectory change displayed on the graphical display; and communicating the in-route trajectory change to a ground-based air route traffic controller.

2. The method of claim 1, wherein manipulating an user interface function includes chronologically and repeatedly updating and displaying predictive weather information relative to predictive aircraft position information for each time increment from current time T to time T+X, as current time T increases with the natural passage of time.

3. The method of claim 1, wherein displaying the current aircraft position information for time T includes displaying a symbol representing a position of an aircraft at time T.

4. The method of claim 1, wherein at least one of: the current weather information and the predictive weather information is displayed in one of: two-dimensions, three-dimensions, and four-dimensions.

5. The method of claim 1, wherein selecting the predictive time interval X includes selecting a predictive time interval button on the graphical display.

6. The method of claim 5, wherein selecting the predictive time interval button includes selecting the predictive time interval button from a plurality of predictive time interval buttons, where the plurality of predictive time interval buttons represents a plurality of different time intervals.

7. The method of claim 5, wherein selecting the predictive time interval button includes clicking on the predictive time interval button with a mouse.

8. The method of claim 1, wherein selecting the predictive time interval X includes selecting a predictive time interval slider button on the graphical display.

9. The method of claim 8, wherein selecting the predictive time interval slider button includes dragging the predictive time interval slider button along a slider range representing time T to time T+X to sequentially display predictive weather information relative to predictive vehicle position information for each time increment from time T to time T+X.

10. The method of claim 1, wherein selecting the predictive time interval X includes hovering a cursor over a predictive time interval slider range on the graphical display.

11. The method of claim 10, wherein hovering the cursor over the predictive time interval slider range includes moving the cursor along the predictive time interval slider range to sequentially display predictive weather information relative to predictive vehicle position information for each time increment from time T to time T+X.

12. The method of claim 1, wherein the predictive time interval X is one minute.

13. The method of claim 1, wherein predictive weather information generated for at least one time increment includes predictive weather information with no corresponding known weather forecast received by the onboard aircraft computer system.

14. The method of claim 1, further including displaying a graphical representation of the real world physical appearance of terrain and current or predictive weather and traffic on the graphical display, using said current, said predictive, or said extrapolated predictive weather information and traffic data, together with a representation of the vehicle and predictive vehicle position information; and displaying the terrain, weather, traffic and vehicle representations appearing in approximate relative positions, simulating three dimensions on the graphical display, for in-route trajectory planning.

15. The method of claim 14, further including interacting with the graphical display using touch or gestures, to change a view of the terrain, weather, traffic and vehicle representations, or to change or recalculate a flight path based on the terrain, weather, traffic and vehicle representations.

16. A method of providing visual depictions of predictive weather information for in-route vehicle trajectory planning, the method comprising:

providing an onboard aircraft computer system having a processor and a graphical display;

displaying a planned trajectory of an aircraft on the graphical display;

displaying vehicle position information at position P on the planned trajectory;

displaying current weather information on the graphical display, the weather information based on a time when the vehicle is at position P;

selecting a point Y along the planned trajectory, where point Y is downrange of position P;

displaying predictive aircraft position information at point Y on the graphical display;

generating predictive weather information using the processor of the aircraft computer system, the predictive weather information extrapolated from known weather forecasts received by the onboard aircraft computer system, the predictive weather information generated for a plurality of location increments from position P to point Y based on a plurality of corresponding times when the aircraft is at the plurality of location increments;

generating predictive aircraft position information using the processor of the aircraft computer system, the predictive aircraft position information generated for each location increment from position P to point Y;

manipulating an user interface function on the aircraft computer system to sequentially display on the graphical display the aircraft position information at position P relative to the current weather information and the predictive aircraft position information relative to the predictive weather information for each location increment from position P to point Y;

using a route assessment tool on the aircraft computer system to generate an in-flight trajectory change to the planned trajectory, the in-flight trajectory change based on predictive aircraft position information and predictive weather information such that the in-flight trajectory change avoids weather storms, the in-flight trajectory change displayed on the graphical display; and communicating the in-route trajectory change to a ground-based air route traffic controller.

17. The method of claim 16, wherein manipulating an user interface function includes sequentially and repeatedly displaying predictive weather information relative to predictive aircraft position information for each location increment from position P to point Y.

18. The method of claim 16, wherein displaying the aircraft position information at position P includes displaying a symbol representing an aircraft at position P.

19. The method of claim 16, wherein at least one: the weather information and the predictive weather information is displayed in one of: two-dimensions, three-dimensions, and four-dimensions.

20. The method of claim 16, wherein selecting the point Y along the planned trajectory includes selecting a predictive location button on the graphical display.

21. The method of claim 20, wherein selecting the predictive location button includes selecting the predictive location button from a plurality of predictive location buttons, where the plurality of predictive location buttons represents a plurality of different locations on the planned trajectory.

22. The method of claim 20, wherein selecting the predictive location button includes clicking on the predictive location button with a mouse.

23. The method of claim 16, wherein selecting the point Y along the planned trajectory includes selecting a predictive location slider button on the graphical display.

24. The method of claim 23, wherein selecting the predictive location slider button includes dragging the predictive location slider button along a slider range between position P to point Y to sequentially display predictive weather information relative to predictive vehicle position information for the plurality of location increments from position P to point Y.

25. The method of claim 16, wherein selecting the point Y along the planned trajectory includes hovering a cursor over a predictive location slider range on the graphical display.

26. The method of claim 25, wherein hovering the cursor over the predictive location slider range includes moving the cursor along the predictive location slider range to sequentially display predictive weather information relative to predictive vehicle position information for the plurality of location increments from position P to point Y.

27. The method of claim 16, wherein selecting the point Y along the planned trajectory includes hovering a cursor over the planned trajectory on the graphical display.

28. The method of claim 27 wherein hovering the cursor over the planned trajectory includes moving the cursor along the planned trajectory to sequentially display predictive weather information relative to predictive vehicle position information for the plurality of location increments from position P to point Y.

29. The method of claim 16, wherein predictive weather information generated for at least one location increment includes predictive weather information with no corresponding known weather forecast received by the onboard aircraft computer system.

30. The method of claim 16, further including displaying a graphical representation of the real world physical appearance of terrain and current or predictive weather and traffic on the graphical display, using said current, said predictive, or said extrapolated predictive weather information and traffic data, together with a representation of the vehicle and predictive vehicle position information; and displaying the terrain, weather, traffic and vehicle representations appearing in approximate relative positions, simulating three dimensions on the graphical display, for in-route trajectory planning.

31. The method of claim 30, further including interacting with the graphical display using touch or gestures, to change a view of the terrain, weather, traffic and vehicle representations, or to change or recalculate a flight path based on the terrain, weather, traffic and vehicle representations.

* * * * *